United States Patent [19]
Bokser et al.

[11] Patent Number: 5,862,259
[45] Date of Patent: Jan. 19, 1999

[54] PATTERN RECOGNITION EMPLOYING ARBITRARY SEGMENTATION AND COMPOUND PROBABILISTIC EVALUATION

[75] Inventors: Mindy Bokser, San Francisco; Leonard Pon, Los Altos; Jun Yang, Sunnyvale; Kenneth Choy, San Jose, all of Calif.

[73] Assignee: Caere Corporation, Los Gatos, Calif.

[21] Appl. No.: 622,988

[22] Filed: Mar. 27, 1996

[51] Int. Cl.$^6$ .............................. G06K 9/62; G06K 9/74
[52] U.S. Cl. ..................... 382/228; 382/229; 382/156
[58] Field of Search .................. 382/171, 173, 382/177, 179, 228, 229, 156

[56] References Cited

U.S. PATENT DOCUMENTS

| | | | |
|---|---|---|---|
| 4,754,489 | 6/1988 | Bokser | 382/40 |
| 4,773,099 | 9/1988 | Bokser | 382/14 |
| 4,972,499 | 11/1990 | Kurosawa | 382/177 |
| 5,033,097 | 7/1991 | Nakamura | 382/177 |
| 5,060,277 | 10/1991 | Bokser | 382/14 |
| 5,077,807 | 12/1991 | Bokser | 382/14 |
| 5,133,023 | 7/1992 | Bokser | 382/40 |
| 5,261,009 | 11/1993 | Bokser | 382/40 |
| 5,347,595 | 9/1994 | Bokser | 382/36 |
| 5,487,117 | 1/1996 | Burges et al. | 382/173 |

*Primary Examiner*—Phuoc Tran
*Attorney, Agent, or Firm*—Burns, Doane, Swecker & Mathis, L.L.P.

[57] ABSTRACT

A pattern recognition system classifies images of patterns in which the definition of individual features of the pattern may have become blurred. The image is segmented into pieces of arbitrary size and shape, and various combinations are examined to determine those which represent the most likely segmentation of the pattern into its individual features. These individual features are then classified, according to known techniques. Through the use of a second order Markov model, not all possible combinations of pieces need to be examined, to determine the best ones. Rather, the examination of various combinations is limited in accordance with previously determined information, to thereby render the process more efficient. By combining multiple, independently determined probabilities, the accuracy of the overall operation is enhanced.

10 Claims, 4 Drawing Sheets

PATTERN RECOGNITION EMPLOYING ARBITRARY SEGMENTATION AND COMPOUND PROBABILISTIC EVALUATION

FIELD OF THE INVENTION

The present invention is directed to pattern recognition, such as character and word recognition, and more particularly to the recognition of patterns in an image where arbitrary segmentation and compound probabilities are employed to improve recognition accuracy.

BACKGROUND OF THE INVENTION

The field of optical character recognition (OCR) has evolved to the point where the individual characters on a relatively "clean" document can be automatically classified and recognized with a high degree of confidence. The reliability of OCR software in this context is due, at least in part, to the fact that the individual characters are well segmented relative to one another. In other words, the spaces between characters are sufficiently clear that the individual characters can be readily distinguished from each other. In such a case, the pattern for each character can be separately classified and grouped into recognizable words, without a great degree of difficulty.

A more problematic situation is presented by lower quality documents in which the distinctions between individual characters may not be clear. For example, documents which have undergone multiple generations of photocopying, particularly with varying degrees of enlargement and reduction, as well as facsimile copies of documents, often do not have sharply defined characters. In these situations, the lines of one character may merge with those of adjacent characters, so that the distinct patterns for the individual characters cannot be readily ascertained.

In such a situation, the character recognition device is forced to impose segmentations based on different features in an image of a word. In some cases, the segmentation can be based on distinguishing aspects of the image, to increase the reliability of the process. As the quality of the image decreases, however, the reliability of such segmentation also diminishes.

Ideally, it would be desirable to analyze all possible (or all reasonable) segmentation paths of a word image. Moreover, for each segmentation path, it would be desirable to analyze all possible (or all reasonable) symbolic interpretations of that segmentation path. Finally, it would be desirable to identify the segmentation path and symbolic interpretation thereof that is most likely to be the correct interpretation of a word. However, there are certain difficulties associated with attempts to practice this ideal recognition process. If all reasonable segmentations are considered, the number of possible combinations of segments that need to be analyzed for potential character patterns goes up exponentially. Furthermore, as the number of segments increases so too does the number of symbolic interpretations, thereby adding another complexity multiplier. To examine all the reasonable segmentation paths and symbolic interpretations for a word of any appreciable length there are literally billions or trillions of possibilities that need to be analyzed to determine the word represented by the image.

Even assuming that a technique could be found which permits examination of the billions or trillions of possibilities, the issue remains as to how to pick the "best" possibility. This can be conceptualized as finding a needle in a haystack. In addition to the complexity issues raised by the combinatorial explosion of possibilities described above, it is not currently known in the art how to assign a probability to an arbitrary segmentation string/symbolic interpretation that reflects its likelihood of being correct with sufficiently high accuracy given the billions or trillions of possibilities. Yet another problem is to provide sufficient flexibility to deal with different types of documents and document portions whose solutions to these complexity issues may themselves differ.

Accordingly, it is desirable to provide a technique for recognizing images in a manner which permits a pattern to be divided into an arbitrary number of pieces that are sufficiently small to avoid the likelihood of overlapping two features, and yet which permits the examination of the possible features represented by the various combinations of the pieces to be performed in an efficient manner.

SUMMARY OF THE INVENTION

In accordance with the present invention, the foregoing objectives are achieved by means of a procedure comprised of three basic steps. In the first step, an image of a word, or other pattern to be recognized, is divided into a number of pieces, termed herein "epoxatoms", each of which is sufficiently small that it does not overlap two recognizable units (e.g., a character, a pair of characters, or any other known pattern) or at least not to any great extent. The individual epoxatoms can be of any arbitrary shape and size. Techniques according to the present invention allow the epoxatoms to be arbitrarily small without overburdening the recognition process.

As a second step, individual adjacent epoxatoms are grouped in different combinations, to create strings of epoxatoms. As a third step, a probability is assigned to each string of epoxatoms, which indicates the likelihood that the string of epoxatoms represents a particular recognizable unit.

The assignment of a probability to each string of epoxatoms is based upon multiple sources of information. In an exemplary embodiment of the invention, the probability assigned to a string of runes is a combination of three separately determined probabilities. One such probability is assigned on the basis of character classification techniques. A second probability is assigned to the segmentation of the various strings of epoxatoms. The third probability is based upon the context of the recognized pattern. These three probabilities are combined to produce a composite probability for a particular string of epoxatoms.

The various epoxatoms of the image are grouped in different combinations to determine the likelihood that each grouping represents a recognizable unit. Different combinations of the strings of epoxatoms may result in pattern estimates having differing numbers of recognizable units. If a separate probability is assigned to each string of epoxatoms, the probabilities assigned to the various combinations will be dependent upon the number of recognizable units in each combination. To avoid improper biases that are related to the number of recognizable units in a combination, a normalization process is employed so that combinations of differing lengths can be reliably compared against one another.

Since the individual epoxatoms of the image can be of any arbitrary size and shape, the number of possible combinations can become quite large. To reduce the required computational effort, every possible combination does not need to be examined. Rather, using an n-th order Markov model and maximum likelihood sequence estimation techniques, the determination of probabilities for combinations of epoxatoms is limited to only those combinations having a maximum likelihood through the most recent nodes.

These various features of the invention, when combined, result in a pattern recognition technique that allows an image to be finely and arbitrarily segmented, so as to increase the reliability of the recognition process, without requiring an impractical amount of processing power. Each reasonable segmentation path and symbolic interpretation thereof are evaluated to identify a most likely segmentation path and interpretation combination. A neural network can be used to provide combinations and weightings of the different types of probabilities used to evaluate the segmentation paths and symbolic interpretations. The neural network can be trained to select an optimal result given different input parameters, e.g., type of document being processed. The features of the invention, and the advantages attained thereby, are explained in greater detail hereinafter with reference to exemplary embodiments illustrated in the accompanying drawings.

DETAILED DESCRIPTION

To facilitate an understanding of the present invention, it is explained hereinafter with reference to exemplary implementations in the field of word recognition. It will be appreciated, however, that the principles of the present invention are not limited to this particular application. Rather, the invention has utility in any environment in which it is desirable to recognize images or patterns, e.g., compound objects, such as documents with embedded graphics, etc., or more generally, to find an optimal path through an arbitrary, directed graph subject to one or more cost or likelihood functions.

Figure 1:
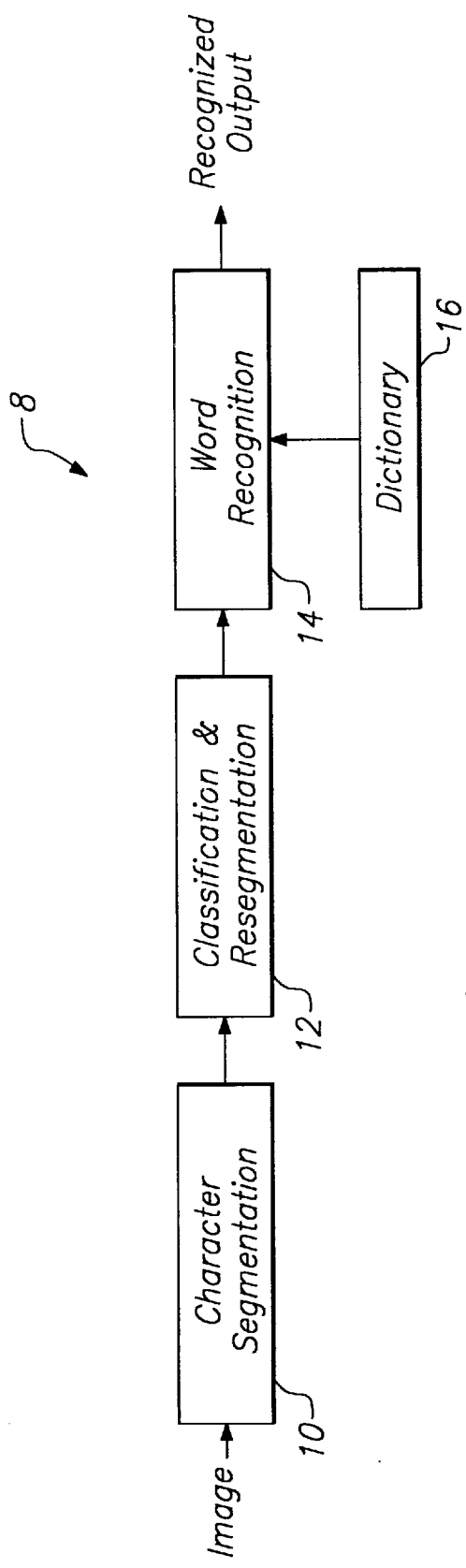
FIG. 1 is a general block diagram of a conventional word recognition system.

A conventional word recognition device is illustrated in block diagram form in FIG. 1. Referring thereto, an image of a word is provided to a character segmentation module 10. The image of the word might be taken from a document, or the like, and might be identified as a word on the basis of the amount of space between individual detectable patterns. In the character segmentation module 10, the image is divided into individual pieces that are estimated to represent distinct characters. The segmentation is carried out at a coarse level in the module 10, and in accordance with well known techniques, is based upon different recognizable features in the image. For example, the relatively wide spaces provided between characters provide a form of distinctive marker that can be used as a basis for segmentation.

After the image has been initially segmented, it is provided to a classification and resegmentation module 12. Within this module, a confidence level is determined for each letter that might be represented by each segmented portion of the image. In addition, the image can be resegmented within this module to determine whether a different segmentation results in a higher confidence for one or more strings of possible letters. The classification and resegmentation steps can be carried out in an iterative manner, in accordance with known techniques, to determine a number of strings with the highest confidences. The determined strings and their confidences are fed to a word recognition module, which compares them with entries in a dictionary 16. Although only one dictionary is depicted in the embodiment of FIG. 1, multiple dictionaries can be employed to accommodate different situations. Thus, for example, the images from a normal document might be compared against words appearing in a standard dictionary for a particular language, whereas a document from a particular regulatory agency, or the like, might require the use of a second, specialized dictionary which contains acronyms or other special terms used by that agency. In the word recognition module 14, the strings provided by the classification and resegmentation module 12 are compared against the entries in the dictionaries to identify those which have the greatest confidence of being a recognizable word.

The recognized output of the word recognition module 14 is an estimate of the word represented by the input image, which has been determined as a most likely sequence of characters given the contextual confidences assigned in word recognition block 14. To understand the conventional technique used to identify the most likely sequence of characters, an illustrative example is provided below with respect to FIGS. 2 and 3.

Figure 2:
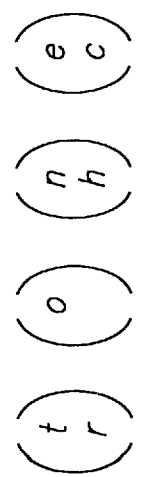
FIG. 2 is an example of different possible interpretations of a four-character text string.

FIG. 2 illustrates, at a conceptual level, an output of classification and resegmentation block 12 for an input image comprising the word "tone". Note that segmentation block 10 has subdivided the input word into segments each associated with one character, e.g., using the spacing between characters as a segment delimiter. Also note that for three of the segments, the classification and resegmentation block 12 provides two different hypotheses of the imaged character. Thus, there are eight different possible combinations of characters, one of which will be selected by word recognition block 14 as the most likely. Probabilities can be used in a straightforward (but time consuming) manner to determine the most likely combination. For example, the contextual probability for the word "tone" can be expressed as follows:

$$p(\text{``tone''}) = p(t) \bullet p(o|t) \bullet p(n|to) \bullet p(e|ton)$$

This equation states that the probability that the text string represents the word "tone" is equal to the probability $p(t)$ that the first character is the letter "t" (based on known English statistics) for example, times the probability $p(o|t)$ that the second character is an "o", given that the first character is a "t", times the probability $p(n|to)$ that the third character is an "n", given that the first two characters are "to", times the probability $p(e|ton)$ that the last character is an "e" if the first three characters have been classified as "ton". The same type of probability can be computed for each of the other seven possible combinations of characters represented in FIG. 2.

Conventional techniques also may employ an n-th order Markov model to reduce the computational effort that is required to determine the probabilities. In accordance with, for example, a second order model, an assumption is made that any character which is more than two places away from the character of interest is too far displaced to influence the probability determination. Characters within two places can, however, be used to quantify the likelihood of a particular character of interest's identity. In the English language, for example, it is rare that a word will contain three successive consonants. Thus, if a character of interest is immediately preceded by two consonants, the probability that it is also a consonant will be low. In this case, it is not necessary to look any further back than the two previous characters. In the last term of the above equation, the probability that the fourth character is the letter "e" is based on the preceding three characters "ton". However, according to the second order Markov model, the letter "t" is too far away from the character of interest, i.e., "e", to influence the probability. Therefore, the last term in the equation above can be replaced by the approximation p(e|on), i.e., the probability that the fourth character is an "e", given that the two preceding characters are "on".

Of course, this eight possible combination example is rather simplistic. As those skilled in the art will appreciate, the computational complexity for this "brute force" approach of calculating the cumulative probability for each combination of possible characters becomes slow and processing intensive as the number of segments and possible characters associated with each segment increases. Thus, conventional recognition systems also rely on maximum likelihood sequence estimation (MLSE) techniques to reduce the number of computations.

Figure 3:
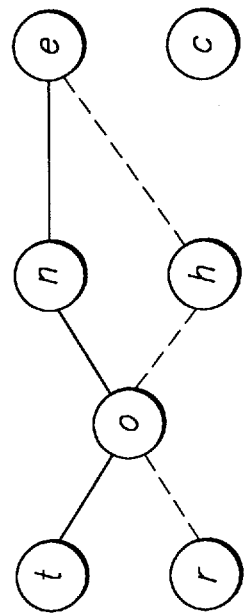
FIG. 3 is a trellis diagram used to explain Viterbi techniques.

Perhaps the most widely used MLSE technique is the Viterbi algorithm. The Viterbi algorithm has been acknowledged as the equivalent of a dynamic programming solution to the problem of finding the optimal path through a weighted graph. Accordingly, the Viterbi algorithm is applicable to the problem of finding the most likely sequence of characters given the contextual probabilities described above. Specifically, Viterbi recognized that the problem of finding the most likely sequence at each decision point (node), reduces to an evaluation of the most likely sequences determined for that node's predecessors. Consider the previous "tone" example as shown in FIG. 3. Therein, the most likely paths through the predecessors of character "e" (i.e., "n" and "h") have been sorted along with their associated, cumulative probability (metric). To determine which path (dotted or solid) through node "e" is the survivor, the Viterbi process simply evaluates the following:

$$p(\text{"tone"})=p(\text{"ton"}) \bullet p(e|n) \quad (1)$$

$$p(\text{"rohe"})=p(\text{"roh"}) \bullet p(e|h) \quad (2)$$

Note that this example incorporates the assumptions of a first order Markov model. From the foregoing it can be seen that the computational complexity is significantly reduced as compared with the "brute force" method, which would have also evaluated p ("tohe") and p ("rone"), for example. Those readers interested in obtaining more information relating to MLSE techniques such as Viterbi's algorithm are referred to *Error Control Coding: Fundamentals and Applications* by Lin et al., Chapter 11, pp. 315–349, the disclosure of which is incorporated here by reference.

One problem with the above-described conventional recognition technique is its restriction on segmentation. As mentioned earlier, segments are conventionally created in reliance upon parameters such as character spacings, which become problematic when the spaces are not found, e.g., when a document becomes blurred or distorted, or when the patterns being evaluated are not words or letters. Finer segmentation is also desirable for the purposes of improving the overall accuracy of the recognition process, e.g., by providing more data for probabilistic evaluation. According to one aspect of the present invention, segmentation is arbitrary in size and shape and is not limited to, for example, individual characters of an imaged word.

Figure 4:
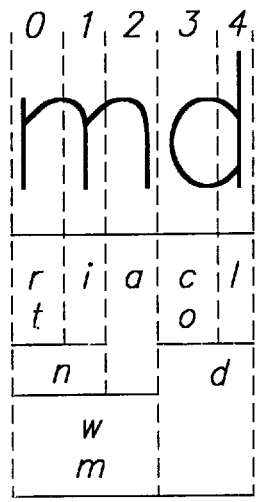
FIG. 4 illustrates an example of a two-character image that has been segmented according to the present invention, and possible combinations of the segments.

This feature of the present invention will be explained with reference to an exemplary two-character text string consisting of the letters "md". Although this two-letter string does not itself comprise a readily recognized word, it serves as a useful example for illustrating the principles of the invention. As a first step, the image of the word is segmented into contiguous pieces. Referring to FIG. 4, these individual pieces could comprise vertical slices of the image. Although vertical segmentation is particularly useful in the context of word recognition, the invention is not limited to this type of segmentation. Rather, the image can be segmented into pieces of any arbitrary size and shape. The only considerations regarding the segmentation of the image into pieces are that the combination of all pieces cover the entire image, i.e., there are no, or few, "holes," and that the pieces be substantially mutually exclusive, such that no two pieces substantially overlap the same portion of the image.

Figure 5A:
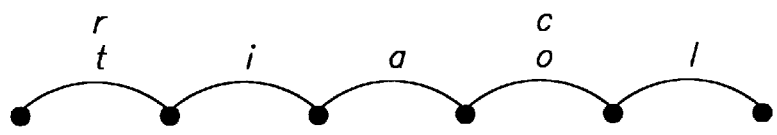
FIGS. 5a–5g are diagrammatic representations of the possible text string paths for the image of FIG. 4.

Preferably, the pieces are sufficiently small that no individual piece overlaps two different recognizable units (e.g., individual characters, multiple characters, word fragments or any other known pixel pattern). However, a slight overlapping of two recognizable units can be tolerated. In the context of the present invention, each individual piece of the image is known as an "epoxatom." In the example of FIG. 4, the image has been divided into five exemplary epoxatoms, which are respectively labeled 0–4. Once the image of the word has been segmented, the individual epoxatoms are grouped in various manners to see if they represent recognizable units. In the context of the invention, a group of one or more epoxatoms is known as a "rune." FIG. 4 illustrates possible groupings of the various epoxatoms. At a first level, individual epoxatoms can be considered to represent a separate recognizable unit. In other words, an individual rune can consist of a single epoxatom. In this case, the first rune could represent the letter "r" or "t", the second rune might represent the character "i", the third rune could be interpreted as the letter "a", the fourth rune might represent either of the letters "c" or "o", and the fifth rune could be classified as the letter "l". FIG. 5*a* is a graphic illustration which represents the segmentation of the image into this particular combination of runes. In essence it is a graph of four possible "paths" that can be taken to classify the image of the word.

Figure 5B:
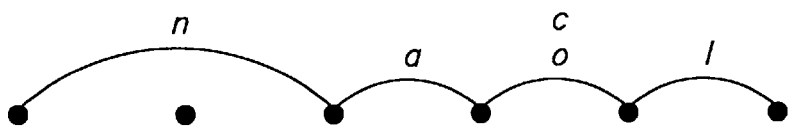
Figure 5C:
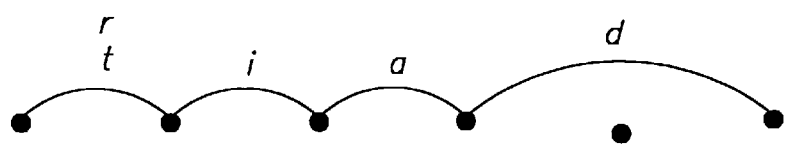
Figure 5D:
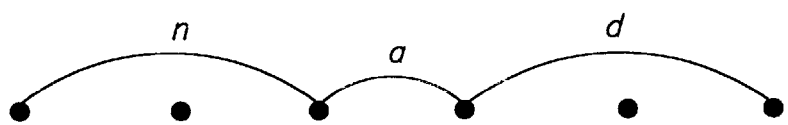

At a second level, adjacent epoxatoms can be combined to form a rune. Thus, for example, epoxatoms 0 and 1 can be combined to form a rune that could be interpreted to represent the letter "n". Similarly, epoxatoms 3 and 4 can be combined to form a rune that might be interpreted to represent the letter "d". The five possible paths that could be taken with these groupings are illustrated in FIGS. 5*b*, 5*c* and 5*d*. Although not expressly shown in FIG. 4, another alternative at this level might be to group epoxatoms 1 and 2 together to form a rune that is interpreted as the letter "n". This possibility is, however, shown in the composite graph of FIG. 5*g*.

Figure 5E:
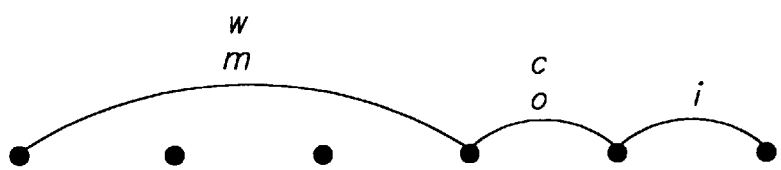
Figure 5F:
Figure 5G:
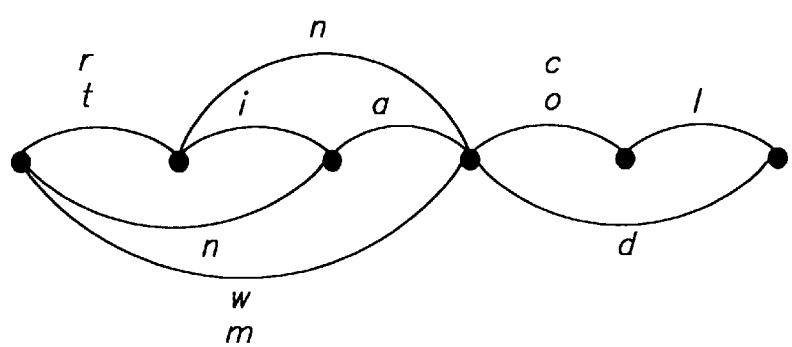

At yet another level, contiguous epoxatoms can be combined to form a rune. Thus, for example, epoxatoms 0, 1 and 2 can form a rune which might be interpreted to represent the letter "w" or "m". The six additional possible paths that can be followed, using this grouping of epoxatoms, is illustrated in FIGS. 5e and 5f. FIG. 5g represents the composite of all fifteen possible paths that can be followed according to the various groupings of the epoxatoms shown in FIG. 4.

Figure 6:
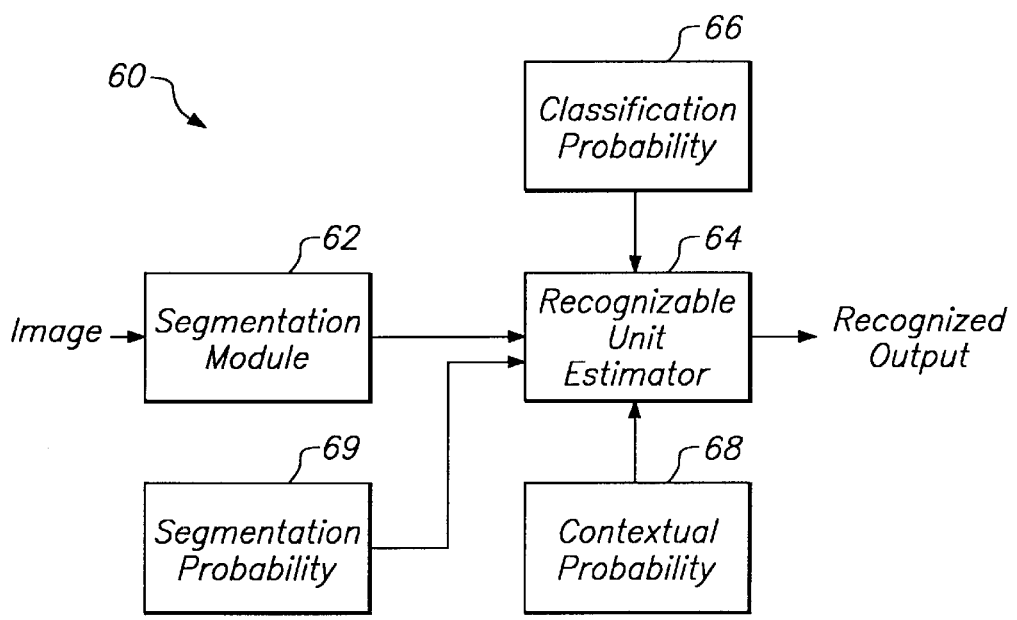
FIG. 6 is a block diagram representation of an exemplary pattern recognition system according to a first embodiment of the present invention.

FIG. 6 illustrates an exemplary pattern recognition system according to the present invention. Therein, the segmentation process described above with respect to FIGS. 4 and 5 is performed in segmentation module 62. The identified segments are then passed to recognizable unit estimator 64. Recognizable unit estimator 64 evaluates the possible combinations provided by the segmentation module 62.

Referring again to the example of FIG. 4, and the path represented in FIG. 5g, suppose that the recognizable unit estimator was at the point in the process of determining the maximum likelihood path that ended in "c". To do this, unit 64 would store (for a second order Markov model) the probabilities associated with the best paths through each of "rn", "tn", "ia", "na", "w" and "m". The next step would be to calculate, using these stored probabilities as well as the probabilities associated with "c" itself, the highest probabilities associated with pairs "nc", "ac", "wc" and "mc".

However, application of the Viterbi algorithm to the segmentation groupings evaluated in module 62 is not straightforward. Consider, for example, that the two examples described above have a different number of evaluated nodes (i.e., FIG. 5a has six nodes, while FIG. 5b has only five). Thus, segmentation according to the present invention can result in one or more skipped states—a situation which the Viterbi algorithm is not capable of handling. This situation was not encountered in the conventional techniques described above since there existed a 1:1 relationship between segments and recognizable units (e.g., characters).

These skipped states or nodes result in rune strings having differing lengths. As noted above, the probability associated with a particular rune string is equal to the product of the probabilities for each of the runes in the string. Except in extremely rare circumstances, every probability has a value which is less than 1. As a result, longer rune strings will naturally have lower probabilities than shorter text strings, since a greater number of fractional terms are being multiplied together. In other words, the results produced by the probability equation above have an inherent bias towards shorter rune strings. To eliminate such a bias, the computed probability for each rune string is multiplied by a normalization factor, so that rune strings of differing lengths can be reliably compared against one another. In accordance with an exemplary embodiment of the present invention, this normalization factor is a function of the string length, e.g., equal to $n^L$, where n is the number of characters in the classification set, e.g., all of the characters in the alphabet, and $L$ is equal to the length of the string. Each probability that is calculated for an rune string is multiplied by this factor, so that different interpretations of a recognizable unit having differing lengths can be compared to one another. For example, referring to the graphs of FIGS. 5a, 5b and 5d, the ultimate probability determined at the last node of each would be normalized by factors of $n^5$, $n^4$ and $n^3$, respectively.

In accordance with another feature of the present invention, the probability for a given string is a combination of multiple probabilities that are separately calculated from different sources of information. In an exemplary embodiment of the invention, three different types of probabilities are employed. For each type of probability described herein, multiple approaches can be used to provide multiple probabilities from each of the probability generating blocks 66, 68 and 69 to recognizable unit estimator 64. These multiple probabilities can be used together in a single probability equation or in various combinations in different probability equations. This aspect of the present invention will be described below in more detail with respect to the exemplary embodiment of FIG. 7. The first one of these probabilities is referred to as a visual character classification probability and is provided by module 66. This probability represents a likelihood associated with the fact that a given rune has been previously recognized as a particular character. For example, the classifier can have a stored set of extracted features associated with each recognizable unit. The stored set of features associated with the rune of interest can then be compared with features (e.g., a pixel pattern) of the rune extracted from a document. Based on the differences identified as a result of the comparison, a score can be given. The score is then used to determine a visual character classification probability associated with the likelihood that the segmentation is correct.

The second probability, provided by module 68, is labeled a "contextual" probability. Several different types of approaches can be employed for determining a contextual probability. In one approach, referred to here as an Ngram or Longstats approach, probabilities of combinations of letters for a particular language are determined and stored. For example, the combination of letters "t" followed by "h" followed by "r" would have a greater stored probability than that of "ttq" in English. In a "full" contextual mode associated with an Ngram approach, the stored probability of one string of runes is directly contrasted with the stored probability for another string of runes. Another Ngram mode for determining contextual probability is known as the "structural" mode. This approach is useful in situations which do not follow the normal rules of a particular language. For example, the characters appearing on license plates, and other registration devices, typically are not normal English-language words. Rather, they may follow certain rules, such as letters being grouped with letters and numbers being grouped with numbers. In the structural contextual approach, these rules are employed to determine the probability for a given string of runes.

Other techniques for generating contextual probabilities can also be applied in conjunction with (or in place of) the Ngram techniques. A frequency tagged dictionary can be used which provides information regarding the statistical frequency of usage of words. For example, this dictionary might indicate that "and" is very common whereas another word which might be confused by a character classification unit with "and" (e.g., "arid") is relatively rare.

Yet another type of contextual probability which can be employed in block 68 is a filter which provides some other contextual priority. For example, regular expressions having known lengths and character types, such as serial numbers, can provide the constraints for such a contextual probability filter.

The third type of probability that is employed in the context of the present invention is known as a segmentation probability. This approach identifies the probability that a rune is correctly segmented, i.e., that a particular grouping of epoxatoms is correct. For example, referring again to FIG. 4, a first segmentation probability is associated with epoxatoms 0, 1 and 2 being grouped individually as three different runes. A second segmentation probability is associated with epoxatoms 0 and 1 being grouped as a first rune and epoxatom 2 being grouped as a second rune. A third segmentation probability is provided for the single rune that results when all three epoxatoms 0, 1 and 2 are grouped together.

The segmentation probability can be determined in different ways based upon the manner the rune was created. According to one exemplary embodiment, a segmentation probability can be determined based upon the segmentation technique used to divide the image. Consider the exemplary embodiment of FIG. 8 wherein a novel recognition system in accordance with the present invention (e.g., the system 60 or 70) is provided downstream of a conventional word recognition system (e.g., system 8 of FIG. 1). For runes passed to system 80 from system 8 ("conventional runes"), the reliability of the conventional system 8 to correctly segment that rune is retrieved from memory. Such stored probabilities may be generated from modeling system performance. For example, many training images can be run through the conventional system in the lab. All of the conventional runes output from system 8 which are labeled 'x' are examined. The fraction of these that are correctly segmented is determined. This fraction is then used to generate and store a probability that a system 8 rune is correctly segmented given that it is labeled "x". For example, system 8 may have a high segmentation reliability for runes that are labeled "x", but a low segmentation reliability for runes that are labeled "r" since an "r" can be easily mistaken for a portion of other recognizable units, e.g., an "m". These segmentation probabilities are stored in segmentation probability memory 69.

In a second case, a rune may be created as the result of combining two or more runes as originally segmented by conventional systems, e.g., the "n" that may result as a combination of epoxatoms 0 and 1 in FIG. 4. As another example, the conventional system 8 may have originally segmented a particular pattern as runes which are separately identified as the letters "iij". These three separate runes of the pattern can be combined into a single rune and recognized as the letter "m". Again, the likelihood of the segmentation module to characterize an "n" as, for example, an "r" and an "i" can be determined experimentally by modelling system and system component performance as described above and the probabilities of all such variations and permutations stored in the segmentation probability module 69.

As a third case, an originally presented segment might be divided into two or more runes. For example, an image which was originally classified as the letter "d" might be divided into two segments which respectively represent the letters "c" and "l". The probability that such a segmentation is correct is based upon whether similarly segmented patterns have been previously recognized in the document as corresponding to those letters.

Figure 7:
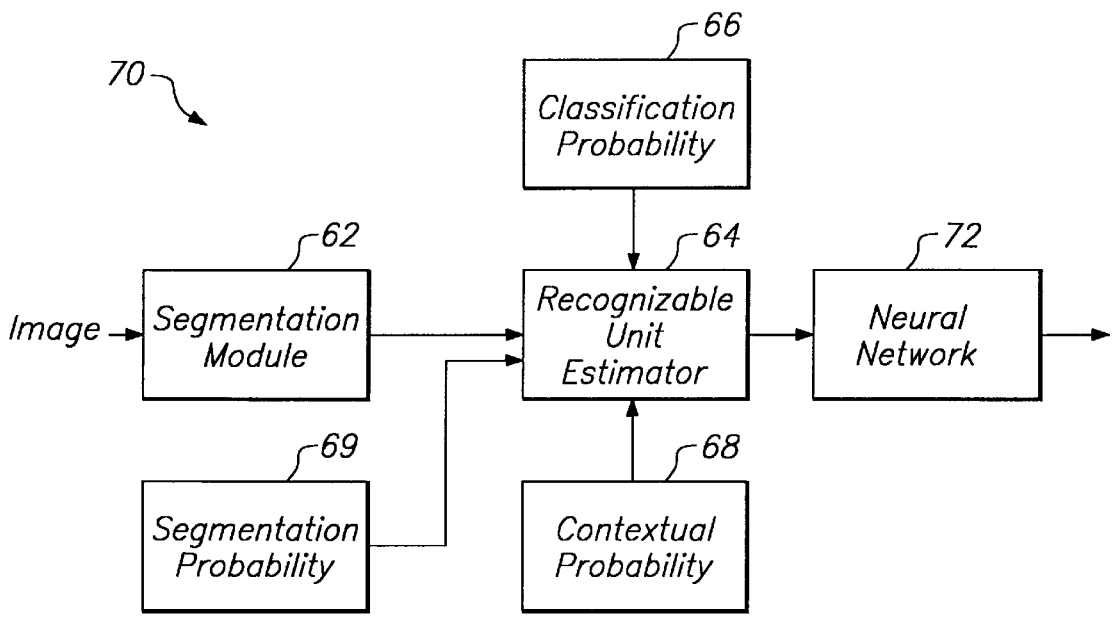
FIG. 7 is a block diagram representation of an exemplary pattern recognition system according to a second embodiment of the present invention.

In an exemplary embodiment of the invention, each of the three different types of probabilities, namely character classification, contextual and segmentation, are multiplied together to determine a composite probability that is used in evaluating the possible combinations to determine a most likely recognizable unit. In another exemplary embodiment of the present invention, different combinations and weightings of the individual probabilities are employed, to give multiple results. Each of these different combinations generates an optimal string whose probability components (and possibly other features as well) are then supplied to a neural network 72, as seen in FIG. 7, which then determines the best choice of the various rune strings, to produce a final result indicating the rune string that is most likely represented by the original input image. For example, the neural network can instruct the system to provide an output from estimator 64 using the full contextual probability approach, and another one can be generated using the structural contextual probability approach. As a third alternative, no contextual probability might be computed, in which case the final result is simply the product of the visual character classification probability and the segmentation probability. Yet another alternative is for the neural network to provide a weighted version of the contextual probability in combination with the visual character classification and segmentation probability. In summary, the neural network can instruct the system of FIG. 7 to evaluate segmentation paths and symbolic interpretations based on any desired probability constraints, i.e., any combination and variation of the different types of probability described above, as well as other types of probabilities that will be apparent to those skilled in the art. The neural network can be trained in accordance with known techniques to recognize which combination of probability parameters is most likely to be optimal given certain image input parameters, e.g., the type of document being processed.

To more fully appreciate the present invention, a numerical example is provided below to illustrate the operation thereof. Of course, the numerical probability values provided in this example are arbitrary and were selected merely for purposes of illustration and not limitation.

Recall the example discussed above relating to the way in which the recognizable unit estimator 64 tracked predecessor node pairs to determine the maximum likelihood paths which included the recognizable unit "c" in FIG. 5g. One such node pair was "tn". Suppose that, for this iteration, the neural network 72 provided the recognizable unit estimator 64 with the task of determining the probability associated with the string of runes "tnc" given that:

$$v(t) = 0.8 \quad s(t) = 0.4 \quad c(t) = 0.1$$
$$v(n) = 0.7 \quad s(n) = 0.65 \quad c(n) = 0.0002$$
$$v(c) = 0.6 \quad s(c) = 0.6 \quad c(c) = 0.00004$$

where:

v("letter")=the visual character classification probability of that letter;

s("letter")=the segmentation probability of that letter, and c("letter")=the cumulative contextual probability as of that letter.

Since this example begins at the node associated with "c", the recognizable unit estimator 64 will retrieve the probability associated with the rune string "tn". Specifically, it would retrieve the value p("tn") where:

$$p(\text{``tn''}) = (0.8)(0.7)(0.4)(0.65)(0.0002)(152^2)$$

Note that, in the foregoing equation, normalization is provided for an exemplary character set having 152 members. Then, the value p("tnc") would be:

$$p(\text{``tnc''}) = \frac{p(\text{``tn''})(0.6)(0.6)(0.00004)(152)}{0.0002}$$

From the foregoing, it can be seen that the present invention provides a technique for examining images of patterns. By segmenting the pattern into pieces of arbitrary size and shape, various combinations can be examined to determine those which represent the most likely segmentation of the pattern into its individual features. Furthermore, by combining multiple, independently determined probabilities in addition to these segmentation techniques it now becomes possible to identify a "best" string among the billions or trillions of possibilities.

It will be appreciated by those skilled in the art that the present invention can be embodied in other forms without departing from the spirit or essential characteristics thereof. For example, although specifically described in the context of word recognition, the principles of the invention are applicable to any type of pattern recognition problem in which the distinctions between individual features of a pattern may be lost. As another example, although the above-described embodiments discuss the evaluation of probabilities (which are to be maximized), those skilled in the art will appreciate that cost functions could be substituted (which are to be minimized.)

As will be appreciated by those skilled in the art, the present invention can be implemented, for example, using a computer, software and scanning equipment. For example, the input image can be acquired using optical scanning equipment and processed in accordance with the foregoing techniques by way of a suitably programmed computer. The image processing techniques described herein can be reduced to software, which software can be stored on a recordable medium (e.g., magnetic or optical storage devices).

Figure 8:
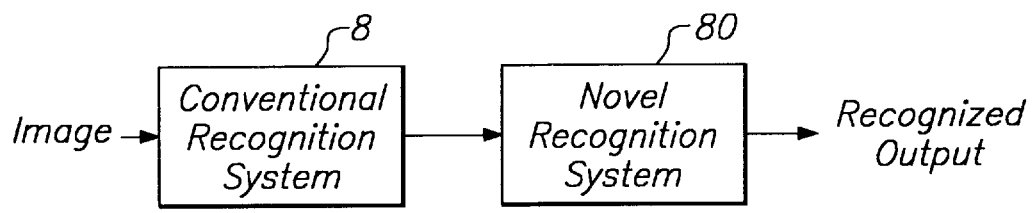
FIG. 8 is a block diagram representation of an exemplary pattern recognition system according to a third embodiment of the present invention.

According to yet another embodiment of the present invention, the embodiment of FIG. 8 can be extended so that multiple different "conventional" or other recognition systems can be provided upstream of system 80. Thus, system 80 will evaluate the outputs of each such system in accordance with the foregoing principles.

The presently disclosed embodiments are therefore considered to be illustrative, and not restrictive. The scope of the invention is indicated by the appended claims, rather than the foregoing description, and all changes that come within the meaning and range of equivalence thereof are intended to be embraced therein.

What is claimed is:

1. A method for classifying an image containing a sequence of patterns, said method comprising the steps of:

segmenting the image into a plurality of pieces of arbitrary size;

forming a plurality of different pattern sequences, wherein each of the plurality of pattern sequences comprises a sequence of runes, and wherein each rune comprises a select subset of the plurality of pieces;

determining a plurality of different probabilities for each of the plurality of pattern sequences, wherein each of the plurality of probabilities represents a different type of probability; and combining the plurality of different probabilities for each of the pattern sequences, thereby generating a composite probability for each pattern sequence, wherein a composite probability reflects a likelihood that the corresponding pattern sequence represents a correct classification of the image.

2. The method of claim 1 wherein one of said plurality of different probabilities is a segmentation probability which indicates a likelihood that the steps of segmenting and forming for a given pattern sequence were performed correctly.

3. The method of claim 2, wherein said segmentation probability is retrieved from one of a plurality of segmentation probability tables, a choice of tables being determined based upon a manner in which said pattern sequence is formed.

4. The method of claim 2 wherein another one of said plurality of different probabilities is a visual recognition probability which indicates a likelihood that a portion of the image within the pattern sequence is classified in a particular pattern class from a set of pattern classes.

5. The method of claim 2 wherein another one of said plurality of different probabilities is a contextual probability which indicates a likelihood that individual patterns in the pattern sequence are properly arranged with respect to at least one other pattern in the pattern sequence.

6. The method of claim 1 further including the steps of:

analyzing the image multiple times using different respective combinations of said plurality of different probabilities to generate multiple possible choices for a pattern represented by the image; and processing the probabilities associated with each of said choices in a neural network to select one of said choices.

7. A method for classifying an image of a word, comprising the steps of:

dividing the image into a plurality of segments of arbitrary size;

combining the segments to form a plurality of different pattern sequences, wherein each pattern sequence contains a string of possible characters, and wherein different pattern sequences contain a different number of possible characters;

determining a probability for each character in a given string of possible characters, and multiplying the probabilities for each character in the string to determine a composite probability for the corresponding pattern sequence;

adjusting the composite probability by a normalization factor that is related to the number of characters in the string; and selecting one of the pattern sequences on the basis of its adjusted composite probability.

8. A method for classifying an image of a word comprising the steps of:

dividing the image into a plurality of sufficiently small segments, wherein no one segment overlaps more than a recognizable pixel pattern;

combining the plurality of segments to form a plurality of possible character sequences, wherein different character sequences have a different number of characters;

selecting a number of character sequences from amongst said plurality of possible character sequences, based on the contextual probability associated with less than all of the characters in each of the plurality of possible character sequences; and determining a classification probability value for each of the selected character sequences using dynamic programming techniques, wherein the character sequences are selected on the basis of a limited number of characters in the character sequence.

9. The method of claim 8 wherein said step of selecting a number of character sequences from amongst said plurality of possible character sequences comprises the step of:

determining a contextual probability value associated with the last two characters in each of said possible character sequences.

10. A method for classifying an image comprised of a plurality of features, said method comprising the steps of:

segmenting the image into a plurality of pieces of arbitrary size;

combining said pieces into a plurality of pattern sequences, each representing a different combination of the pieces;

determining a segmentation probability for each pattern sequence, wherein said segmentation probability represents a likelihood that the image has been correctly segmented and the pieces have been correctly combined; and determining a most likely pattern sequence based upon said segmentation probability.

* * * * *